United States Patent
Cohn et al.

(10) Patent No.: US 12,006,888 B2
(45) Date of Patent: Jun. 11, 2024

(54) MULTIFUEL AUTOMOTIVE ENGINE-DERIVED SYSTEMS FOR CLEAN GRID LOAD BALANCING AND NON-GRID ELECTRICITY APPLICATIONS

(71) Applicants: Daniel R. Cohn, Bridgton, ME (US); Leslie Bromberg, Sharon, MA (US); Howard Gruenspecht, Silver Spring, MD (US)

(72) Inventors: Daniel R. Cohn, Bridgton, ME (US); Leslie Bromberg, Sharon, MA (US); Howard Gruenspecht, Silver Spring, MD (US)

( * ) Notice: Subject to any disclaimer, the term of this patent is extended or adjusted under 35 U.S.C. 154(b) by 71 days.

(21) Appl. No.: 17/968,526

(22) Filed: Oct. 18, 2022

(65) Prior Publication Data
US 2023/0042829 A1 Feb. 9, 2023

Related U.S. Application Data

(63) Continuation-in-part of application No. 17/910,189, filed as application No. PCT/US2021/024846 on Mar. 30, 2021.
(Continued)

(51) Int. Cl.
*F02D 29/06* (2006.01)
*F01N 3/10* (2006.01)
(Continued)

(52) U.S. Cl.
CPC .............. *F02D 29/06* (2013.01); *F01N 3/101* (2013.01); *F01N 3/2066* (2013.01); *F02B 43/10* (2013.01);
(Continued)

(58) Field of Classification Search
CPC ........ F02D 29/06; F01N 3/101; F01N 3/2066; F01N 2610/02; F01N 3/10; F01N 3/20;
(Continued)

(56) References Cited

U.S. PATENT DOCUMENTS 8,427,005 B1 4/2013 Kisner et al.
8,495,869 B2 7/2013 Beissler et al.
(Continued)

OTHER PUBLICATIONS

International Search Report and Written Opinion dated Jun. 23, 2021 in corresponding PCT application No. PCT/US2021/024846.
(Continued)

*Primary Examiner* — Robert L Deberadinis
(74) *Attorney, Agent, or Firm* — NIELDS, LEMACK & FRAME, LLC

(57) ABSTRACT

Modestly modified automotive engine powered generator systems to substantially improve capability for providing renewable electricity powered grid reliability and energy storage are disclosed. The use of these engines to improve capability for non-grid electricity generation, including affordable and clean fast charging of electric vehicles, is also disclosed. In one embodiment, these automotive engines use high RPM and stoichiometric air fuel ratio operation so as to provide the advantages of substantially reduced cost and NOx emissions. These engines also have multifuel capability that provides highly flexible use of low carbon fuels (such as hydrogen, methanol and ammonia) as well as the use of present fuels that are widely available. When these low-carbon fuels are produced with excess electricity from the grid and supplied to the grid when there is an electricity-supply shortfalls, they can serve as a means of energy storage.

31 Claims, 5 Drawing Sheets

Related U.S. Application Data

(60) Provisional application No. 63/306,324, filed on Feb. 3, 2022, provisional application No. 63/287,746, filed on Dec. 9, 2021, provisional application No. 63/270,613, filed on Oct. 22, 2021, provisional application No. 63/147,900, filed on Feb. 10, 2021, provisional application No. 63/106,930, filed on Oct. 29, 2020, provisional application No. 63/016,648, filed on Apr. 28, 2020.

(51) Int. Cl.
| | | |
|---|---|---|
| *F01N 3/20* | (2006.01) | |
| *F02B 43/10* | (2006.01) | |
| *H02J 7/14* | (2006.01) | |
| *H02K 7/18* | (2006.01) | |

(52) U.S. Cl.
CPC ............. *H02J 7/14* (2013.01); *H02K 7/1815* (2013.01); *F01N 2610/02* (2013.01); *F02B 2043/103* (2013.01)

(58) Field of Classification Search
CPC ....... F02B 43/10; F02B 2043/103; H02J 7/14; H02K 7/1815; H02K 7/18
See application file for complete search history.

(56) References Cited

U.S. PATENT DOCUMENTS

| | | |
|---|---|---|
| 2003/0200955 A1 | 10/2003 | zur Loye et al. |
| 2011/0215640 A1 | 9/2011 | Donnelly et al. |
| 2014/0210213 A1 | 7/2014 | Campion et al. |
| 2016/0273211 A1 | 9/2016 | Brewer et al. |
| 2016/0369689 A1 | 12/2016 | Brewer et al. |
| 2017/0237264 A1 | 8/2017 | Johnson et al. |
| 2018/0123349 A1 | 5/2018 | Gleave et al. |
| 2023/0187964 A1 | 6/2023 | Cohn et al. |

OTHER PUBLICATIONS

Notice of Allowance dated Jan. 24, 2024 in co-pending U.S. Appl. No. 17/910,189.

MULTIFUEL AUTOMOTIVE ENGINE-DERIVED SYSTEMS FOR CLEAN GRID LOAD BALANCING AND NON-GRID ELECTRICITY APPLICATIONS

This application claims priority to U.S. Provisional Patent Application Ser. No. 63/270,613, filed Oct. 22, 2021; U.S. Provisional Patent Application Ser. No. 63/287,746, filed Dec. 9, 2021; and U.S. Provisional Patent Application Ser. No. 63/306,324, filed Feb. 3, 2022; and is a continuation in part of U.S. patent application Ser. No. 17/910,189, filed Sep. 8, 2022, which is a National Stage entry of PCT/US2021/024846, filed Mar. 30, 2021, which claims priority to U.S. Provisional Patent Application Ser. No. 63/016,648, filed Apr. 28, 2020; U.S. Provisional Patent Application Ser. No. 63/106,930, filed Oct. 29, 2020; and U.S. Provisional Patent Application Ser. No. 63/147,900, filed Feb. 10, 2021, the disclosures of which are all incorporated by reference in their entireties.

FIELD

The disclosure describes new aspects of multiplexed multifuel automotive engine powered generator systems for providing grid reliability and energy storage using low-carbon fuels; and more particularly, describes new embodiments of multifuel automotive engines systems for providing fast electrical vehicle battery charging and stationary power for homes and commercial entities.

BACKGROUND

Increasing utilization of renewable electricity is planned for both meeting present uses of electricity and for providing electricity for substantially increased use in transportation and other sectors of the economy. Meeting this goal is threatened by both increasing frequency and intensity of adverse weather events and by the variable nature of solar and wind power.

Fuel-based supplemental electricity will be necessary to ensure the reliability needed for dominant use of renewable energy in electricity grids. This supplemental electricity capability will be essential for addressing long-duration, such as greater than 12 hours, shortfalls in electricity supply due to increasingly severe weather impacts from climate change and irregular variations of solar and wind electricity. Present installed battery technology is generally too costly to supply for 4 hours duration electricity at reasonable cost; and this cost increases in a linear fashion with duration, becoming extremely expensive for durations of 12 hours or more.

Low cost per KW supplementary power is particularly important for electricity generation that is used in low capacity factor operation (e.g. less than 10%). Low capital cost/kW also provides greater assurance of providing a greater total amount supplemental power if needed since more power can be available at the same total investment as using a power source with a higher cost/kW. To be successful, the supplemental power source should also provide substantial flexibility in location and in the fuel that is used. In addition, it should minimize air pollutant emissions and greenhouse gas impacts. These features provide the robustness needed to deal with the substantial uncertainties in evolving grid operation.

Because of the pivotal role of meeting these goals for supplemental power and the limitations of present fuel-based technologies, such as open cycle gas turbines and large reciprocating engines used for stationary applications, in addressing them, it is beneficial to develop a more effective approach.

It is also important to improve non-grid power sources, including affordable clean electricity for fast electric vehicle charging, to further enhance electricity supply robustness.

SUMMARY

Modestly modified automotive engine powered generator systems to substantially improve capability for providing renewable electricity grid powered reliability and energy storage are disclosed. The use of these engines to improve capability for non-grid electricity generation, including affordable and clean fast charging of electric vehicles, is also disclosed.

In one embodiment, these automotive engines use high RPM and stoichiometric air fuel ratio operation so as to provide the advantages of substantially reduced cost and NOx emissions. These engines also have multifuel capability that provides highly flexible use of low carbon fuels (such as hydrogen, methanol and ammonia) as well as the use of present fuels that are widely available (such as natural gas, propane, ethanol and gasoline). Present corn-ethanol can be used to reduce greenhouse gas production. When low-carbon fuels are produced with excess electricity from the grid and supplied to the grid when there is an electricity-supply shortfall, they can serve as a means of energy storage.

Low cost per kW in the modified automotive engine powered generators is provided by high engine power density operation (such as 50 to 200 kW of mechanical power per liter). This operation is achieved by high RPM operation and use of a stoichiometric fuel air ratio. Individual engines can be used in certain cases to provide electric power of 200 kW or more, including power levels of 500 kW or more using turbocharging with certain fuels.

These engine powered generators also provide low NOx emissions (such as less than or equal to 0.03 g per kWhr) by use of a three-way catalyst. Moreover, ultra-low NOx emissions (such as 0.01 g per KWhr or less) can be provided by heavy EGR operation and/or additional use of an optimized three-way catalyst+SCR exhaust treatment system. These NOx levels can be 10 to 100 times lower than emission levels of open cycle gas turbines (OCGTs) and large stationary reciprocating engines.

For supplementary grid power applications, massively multiplexed sets of these engine powered generators would typically be used (for example, 30 or more engine generators generating a total power capability of 10 MW or more). These multiplexed sets of engine powered generators can be referred to as multiplexed multifuel automotive engine (MMAE) powered generator sets.

One embodiment of this grid power source is the installation of multiple high power density engine powered generators in a readily truck hauled container module that provides at least 2 MW of electric power. This power module can be referred to as a multiplexed multifuel automotive engine (MMAE) power module. Electricity generation systems of the desired total output (for example, up to hundreds of MW) can be obtained by the number of power modules that are employed.

The engine powered generators and power modules are preferably configured to provide DC power outputs that enable power adjustment by varying engine speed and facilitate power synchronization that provide a very rapid cold start response (such as 10 seconds or less as compared to 600 seconds to an OCGT or large reciprocating engine).

Because of the high-power density operation of the engines and very modest installation costs, an illustrative installed cost per KW of a generation systems comprising one or more MMAE power modules would be less than 25% of the installed cost/KW of an OCGT or large reciprocating engine.

The MMAE power modules and other MMAE power generation systems can also be employed as non-grid backup electricity for businesses, industrial facilities, data centers, medical facilities, water treatment plants, government facilities and other organizations. Their low cost per KW can be particularly useful because of the very low capacity factors that can be typical for these operations. For some of these applications, automotive-derived compression ignition engines and compression ignition fuels, such as diesel fuel, renewable diesel or DME, may be used.

In addition, single or multiple multifuel automotive engines may also be used in systems to provide affordable and clean non-grid rapid electric vehicle charging with either present fuels or emerging low-carbon fuels.

BRIEF DESCRIPTION OF THE FIGURES

For a better understanding of the present disclosure, reference is made to the accompanying drawings, which are incorporated herein by reference and in which.

DETAILED DESCRIPTION

Multiplexed Multi-Fuel Automotive-Derivative Engine Systems

Figure 1:
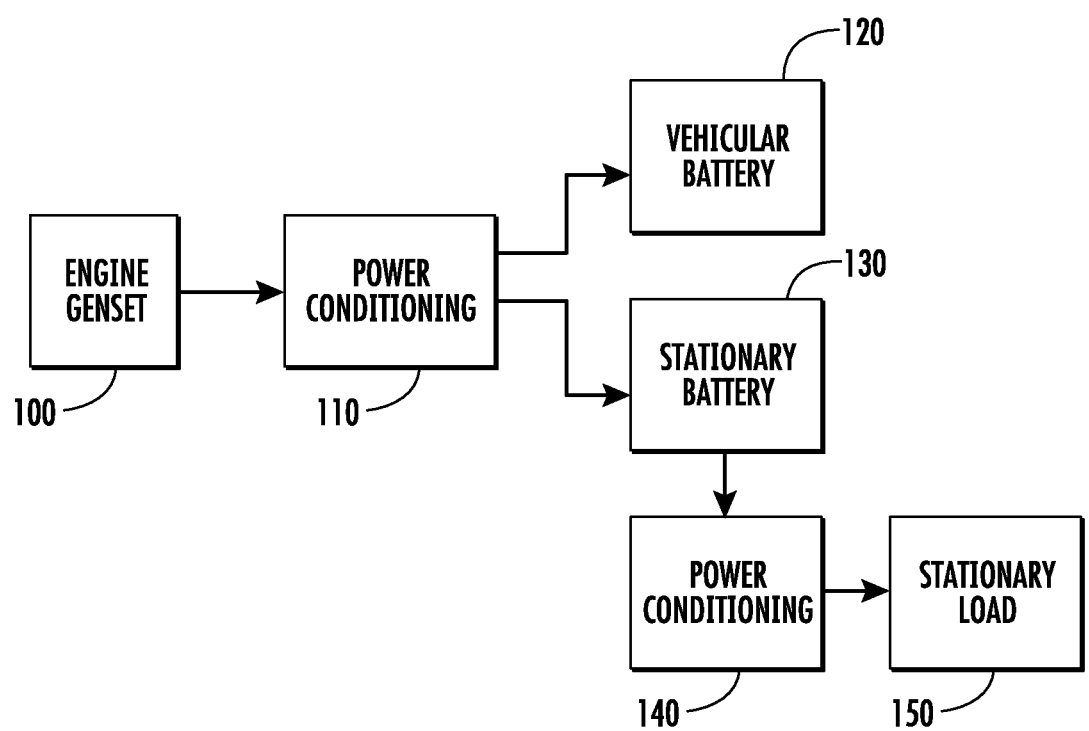
FIG. 1 shows a stoichiometric spark ignition engine powered generator used to provide fast charging of a vehicle battery and a stationary battery for stationary power.

These automotive engines used in the multiplexed multi-fuel automotive engine powered generator sets can also be described as "automotive-derived engines", "automotive-derivative engines" or "autoderivative engines". These terms provide a descriptor for an automotive engine analog to "aeroderivative turbines" which are turbines that are used for stationary power and other non-aeronautical applications and are derived from light weight turbines that are used for aircraft. The auto-derivative engines are preferably engines derived from gasoline engines that use high RPM stoichiometric operation.

These automotive-derivative engines may provide maximum power in the 100 kW to 400 kW range and may be used along with low-cost mass-produced generators for electric vehicles.

These multiplexed automotive engine powered generator sets are well matched to the needs for supplemental fuel-based power provided in low capacity factor (such as a capacity factor of 10% or less) grid load balancing.

These engines can also provide advantages for non-grid backup electricity for users that include hospitals, data centers, commercial businesses, industrial facilities and individual homes. Because of their low cost these multiplexed multifuel automotive engines are especially attractive for very low capacity factor operation (such as less than 1%). The importance of low cost increases with decreasing capacity factor because there is less use of a fixed cost asset.

In addition, the use of a multiple-fuel automotive engine power generator set can still be attractive for applications with higher capacity factors (for example, at 15% or higher) because of lower NOx emissions; greater flexibility in choice of generation system power capability; greater fuel flexibility; faster start time in addition to a reduced cost per kW advantage relative to their use in lower capacity factor operation.

For some applications, the required capacity factor may be 20% or more. For a capacity factor of 20% (around 1750 hours per year), an illustrative light duty vehicle automotive engine has a replacement lifetime of 5000 hrs. Thus, the multifuel automotive engines may need to be replaced around in an interval that is around every 3 years. This would require two replacements of the engine over a nine year system use period. However, the cost per replacement would add less than $50/kW and preferably $30/kW or less.

The multi-fuel automotive-derivative engines provide low cost/kW by operation by using high power density (horsepower per engine displacement) operation. The cost/kW of automotive engines roughly scales inversely with engine power density. The maximum power density at which the high power density engines would operate is in the range of 50 to 200 kW of mechanical power per liter. High power density is achieved by use of high RPM operation (such as, for example, greater than or equal to 3000 RPM), and by use of a stoichiometric fuel/air ratio rather than a lean fuel/air ratio. These two factors can provide engine power densities that are two to four times greater than compression ignition engines using diesel fuel. In addition, spark ignition engines are produced at low cost for very large scale use in gasoline powered cars and light duty trucks. Therefore, it is advantageous to use multifuel engines that are modestly modified versions of spark ignition stoichiometric engines that are used in these vehicles.

The multifuel spark ignition engines can be operated with natural gas and/or with presently available liquid fuels that include corn or sugar-based ethanol (which reduce greenhouse gas emission), gasoline and propane. They can also be operated using low-carbon fuels that include hydrogen, methanol and ammonia as these fuels become available.

The advantages of multi-fuel automotive-derivative engine powered electrical generation systems for providing supplementary electricity for grid electricity supply shortfalls include:

Low cost per KW and low NOx using high power density stoichiometric operation.

Substantially lower cost at an illustrative installed cost of $150 per kilowatt (kW), which is less than 25% of the installed cost of a large reciprocating engine and aero-derivative gas turbine.

A readily transportable modular power unit with an illustrative 3 MW power capability (and 5 MW peak power for short periods). This modular power unit provides great flexibility in providing the power capability of a generation system comprising a chosen number of these units, greater location flexibility and capability for distributed generation.

Lower NOx and also lower methane emissions than lean burn large reciprocating engine by using three-way catalyst treatment of MMAE exhaust.

Lower NOx at partial load than OCGTs by using three-way catalyst treatment of MMAE exhaust.

Capability for further reductions on NOx by using heavy EGR (such as 30% EGR or greater) and/or a three-way catalyst+SCR system. The three-way catalyst+SCR system uses the input of air along with diesel exhaust fluid, urea or ammonia to further reduce the NOx in exhaust from the three-way catalyst to ultra-low levels.

Much faster start time (around 5 sec vs. around 600 seconds for a large reciprocating engine and 600 seconds for an OCGT).

Extensive fuel flexibility, including capability for fuel switching from natural gas and other presently used fuels to use of low carbon fuels, such as low-carbon ethanol, hydrogen, methanol and ammonia.

Use of combinations of these multi-fuel engine powered generator units to both improve grid reliability and enhance the capability for energy storage of excess grid electricity using low-carbon hydrogen, methanol or ammonia.

The multiplexed engine generator units can be employed in a variety of embodiments. They include a set of engine-generator units (for example, 8 to 20 engine powered generators) in a modular power unit that is in a container that is hauled by truck to a generation site. The container power module may be a complete low-cost modular electricity producing unit with a typical maximum power capability with all engine powered generators operating that is greater than 2 MW (for example, in the 2 to 3 MW range).

The total electrical power from a container power module can be varied by turning individual engines on and off while the remaining engines are operated at a steady power level that optimizes their lifetime and efficiency. The power level of the engines can also be varied. When peak power is needed for a limited amount of time, the container power module may provide a power level of 5 MW.

Electricity generation system of a chosen power with maximum power levels ranging from a few MW to a few hundred MW may be provided by the choice of the number of low-cost modular power modules that are employed.

At least 30 engine-generator units may be used for most grid reliability application. The combination of these engine-generator units could provide a maximum total power capability of at least 10 MW. These units would thus be "massively multiplexed". Between 3 and 10 power modules may be typically used to provide this maximum power capability Another readily movable embodiment is a set of engine-generator units in a delivery truck or a van that would generally provide peak powers in the 0.5 to 1.5 MW range. The use of a single engine-generator unit may generally provide a maximum power in the 100 kW to 300 kW range. A further readily moveable embodiment is a single engine generator or multi engine-generator skid.

Stoichiometric Spark Ignition (SSI) Engines

The engine-generator units may generally use modified light duty vehicle gasoline engines that provide maximum power that is generally in the range of 150 kW to 350 kW. A typical operation power which would be used for most of the lifetime of the engine, is generally between 30% and 60% of its maximum power.

These automotive-derived engines would preferably be spark ignition (SI) engines that use a stoichiometric fuel/air ratio and a three-way catalytic converter for highly effective exhaust emissions reduction. The exhaust treatment system would reduce NOx emissions from these stoichiometric spark ignition (SSI) engines to less than 0.05 g/bhp-hr (grams per brake horsepower hour) and preferably less than 0.02 g/bhp-hr during most of their operation time.

Lower NOx emissions than 0.02 g/bhp-hr may be obtained by taking advantage of the steady power operation, avoiding the transients common in vehicular applications and by reducing cold start NOx emissions.

In addition, there are several means for additionally reducing the emissions by decreasing engine out emissions, and/or increasing the effectiveness of the exhaust treatment system. One such means is to use heavy EGR. Emissions of the flexibly fueled engines using stoichiometric operation and a three-way catalyst can be further decreased by using heavy EGR operation (such as 30% EGR or greater). NOx levels of 0.004 g/bhp-hr or lower may be facilitated by heavy EGR operation in combination with the benefit of steady state operation.

Another approach is to use selective catalytic reduction (SCR) treatment of NOx that is in the downstream exhaust from a three-way catalyst. In this approach, air is introduced into the exhaust downstream of the three-way catalyst so as to provide a desired lean mixture for treatment of the exhaust from the three-way catalyst by an SCR catalyst. Diesel Exhaust Fluid, Urea, or Ammonia is also be added to the exhaust from the three-way catalyst prior to its introduction into the SCR catalyst. This approach may also be combined with the use of heavy EGR. In the case of ammonia as the fuel, ammonia could also be used for the SCR treatment.

The combination of the stoichiometric engine with a 3-way catalyst decreases the concentration of NOx to a few tens of ppm. The combination of a three-way catalyst with an SCR catalyst further decreases the NOx concentration by another factor of 10, to single digits (such as less than 10 ppm and preferably less than 2 ppm). The operation of the engine at a narrow set of conditions at high load (the sweet spot) generates adequate temperature for the three-way catalyst and the SCR catalyst downstream from the three-way catalyst. Control of the urea dosing is also facilitated by the constant operating conditions, both in terms of temperature and exhaust flow rate. It may be desirable to control both the emissions of NOx and ammonia when SCR is employed. Various methods can be used for the prevention of ammonia release, including an ammonia oxidation catalyst downstream of the SCR, if needed.

Because the engines operate over a very narrow set of conditions (near the sweet spot), the control system for the SCR may be simplified. The dosing and the monitoring of the SCR unit may be much simplified. In addition, the ammonia on the catalyst or the ammonia/NOx in the SCR exit can be measured to provide feedback. Moreover, an open-loop control is also possible, by itself or in combination with a close loop system.

Although spark ignition engines used in gasoline powered light duty vehicles (such as cars and light trucks) can provide the lowest cost per kW source of power for the generators, embodiments which use engines with longer lifetimes can be more attractive for some applications.

In another embodiment, the modified automotive engines SSI engines may be modified versions of stoichiometric spark ignition engines with three-way catalyst exhaust treatment used for medium and heavy-duty trucks powered by natural gas. While more expensive than engines for light duty vehicles, these heavy-duty engines could provide the advantage of greater engine lifetime (for example, more than 10,000 hrs vs 5,000 hrs for light duty vehicle engines). These heavy-duty engines may also provide more power at low RPM such as 1800 RPM from which 60 Hz AC could be produced by a generator. Another mode of operation may be to operate these engines at higher RPM (greater than 1800 RPM) to obtain more power particularly with fuels that are faster burning than natural gas. These fuels include gasoline, ethanol, methanol, propane and/or DME. The benefits of using fast burning fuels can also be used with automotive-derived engines that are provided by modified light duty vehicle engines.

The SSI engines may provide fuel switching which allows operation with hydrogen alone or in combination with other fuels. They can also be readily switched from operation on natural gas to entire operation on ethanol or a mixture of ethanol with another fuel, hydrogen or a mixture of hydrogen with another fuel. They can also be operated on propane and gasoline. Engine designs may also include capability for operating on ammonia. Ethanol, methanol and ammonia can be low-carbon fuels when produced from biomass, waste and/or renewable electricity.

These SSI engines may be fueled with either high purity hydrogen produced by an electrolyzer or with hydrogen in mixtures with natural gas produced by pyrolytic conversion of natural gas into hydrogen and elemental carbon.

These multi-fuel SSI automotive engines may be operated at high efficiencies (for example, 40% or more) in open throttle operation during at least part of their operation time. Efficiency may be increased by use of water from water recovery to increase knock resistance and/or from higher knock resistance provided by the higher knock resistance of ethanol, methanol or hydrogen used by themselves or in combination with propane, gasoline or another fuel which has a low knock resistance. The higher knock resistance would provide higher efficiency by allowing engine operation with higher compression ratio, greater turbocharging/downsizing level or reduced spark retard. Further, the use of engine heat recovery by reforming of methanol or ethanol into a synthesis gas of hydrogen and carbon monoxide that is then used as fuel in the engine could further increase engine efficiency (such as, for example, to 50% or more for methanol).

In addition, engines fueled with hydrogen, methanol or ethanol can provide faster combustion. This can enable higher EGR levels (such as 30% or more) which can reduce NOx and also increase efficiency.

For some applications, the multiplexed automotive-derivative engine approach may use compression ignition engines powered by diesel fuel or from dimethyl ether (DME), renewable diesel biodiesel or FT diesel that are low-carbon fuels produced from biomass, waste and/or renewable electricity. These engines would preferentially be mildly modified light duty diesel automotive engines that can operate at relatively high RPM (for example, at least 4000 RPM) and provide higher power density than engines used in heavy duty trucks. Selective Catalytic Reduction (SCR) systems could be used to reduce NOx from these engines.

A potential further improvement is the use of multiplexed engines that are powered by emerging low temperature combustion (LTC) technologies which employ auto-ignition. The use of LTC technologies is facilitated by the operation of the engines in a narrow range of the engine map. Operation with LTC offers very high efficiency and very low emissions, without the use of an exhaust aftertreatment system, but it has challenges for control. The challenge of using low temperature combustion is substantially decreased by limiting the operating map to a small region, which could be employed for most of the operation of SSI engines used for electricity production in certain applications (for example, operating the SI engines during a fraction of their operating time, such as startup). Engine lifetime is also increased by the use of low temperature.

The multi-fuel automobile-derivative engine systems will generally be designed to minimize NOx emissions including NOx emissions during cold start (which can be an important contributor to total NOx emissions). Minimizing NOx emissions in cold start combination with use of heavy EGR could increase robustness for reducing NOx emissions levels to 0.004 g/bhp-hr or less.

One option for providing low cold start NOx operation when the power from all the engines in a set of engine powered generators is not required is to alternate employment of individual engines generators in order to maintain a sufficient catalyst temperature for a desired level of catalyst effectiveness. Digital engine control may be used to maintain warmed-up aftertreatment systems of a larger number of engines generators than possible when operation is not shifted between engines. At any time, a given number of engine generators would be operating, but the different engine generators would be employed so as to maximize catalyst warmup in the set of engines. Moreover, several engines may be connected to a single aftertreatment catalyst that is kept warm by operating a fraction of the engines.

Alternatively, it is also possible to operate a small number of engine-generator sets at a high-power level during exhaust treatment catalyst warm up operation, in order to rapidly heat up the catalyst and minimize NOx emissions from these engines. After the exhaust system of the operating engine-generator units are warmed up, their power is reduced. The electricity production is maintained constant by starting other engines which are initially cold at high power. Once the required number of engines is reached, some of the warmed-up engine-generators would be turned off and cold ones would be started with similar operation, in order to assure that enough warmed up engines are available to supply the power needed, when operating at partial load. Total power operation is maintained while achieving rapid warmed up operation. It is estimated that it will take the engine less than 100 seconds to achieve catalyst lightoff when operating at high power. Once the catalyst is warmed up, if the engine is shut down, the temperature of the catalyst decreases with a time constant of about 500 seconds (with no flow through the catalyst). The cooling engines would be restarted periodically to raise the temperature of the catalyst, and then shut down again. The process would be continued until all the operating engines are warmed up.

Reducing NOx emissions to extremely low levels using heavy EGR and cold start control may facilitate a greater choice of siting location. Various techniques can be used to ensure heavy EGR operation (30% or greater) without an unacceptable impact on combustion stability. One of these techniques is the use of a stronger plasma source for ignition than is provided by a spark plug. Another technique is the use of a prechamber which is fueled by alcohol (ethanol or methanol), a high alcohol concentration (such as >50% by volume) alcohol-gasoline mixture such as E85 or hydrogen that may be used to improve prechamber effectiveness. A prechamber using one or more of these fuels may be connected to the cylinder can be substituted for use of a spark plug in the cylinder. This can provide a much more powerful ignition source and provide enhanced spark ignition engine performance including higher flame speed and use of heavy EGR (such as EGR greater than 30%).

Improved prechamber ignition can also employed. Techniques for optimizing prechamber operation in cold start can also be used.

An engine with the prechamber and a stoichiometric fuel/air ratio operation is another form of a stoichiometric spark ignition engine (SSI) engine.

Diesel engines can be modified to operate as spark ignition engines by inserting prechambers where diesel fuel injectors were located and using the prechambers as substitutes for spark plugs. Various fuels such as natural gas, ethanol, ethanol-gasoline mixtures, propane, hydrogen, methanol, and ammonia and various combinations of these fuels can be introduced with port injection or carburation as in the same way as would be the case with use of a conventional spark plug. The use of the prechamber can provide a large increase in flame speed and combustion stability which can allow higher EGR levels and/or operation at higher engine speeds without misfire (particularly in engines with larger cylinders than automotive engines). These modified diesel engines can be used in single SSI engine power generator and multiple SSI engine powered generator embodiments that have been described for modified SI automotive engines.

The truck hauled container power modules that house multiplexed multi-fuel automotive engines (MMAE) will generally provide maximum power of at least 2 MW and preferably at least 3 MW. Another embodiment is a set of generators in a delivery truck or van would generally provide peak powers in the 0.5 to 1.5 MW range. The use of an engine-generator unit may generally use engines that provide mechanical power levels in the 100 kW to 300 kW range.

In addition, a single high efficiency SSI engine-generator unit may provide very local dispatchable power for the grid, especially for backup power for highly infrequent supply short falls. For example, a single SSI engine-generator unit may be employed for use for a single business or set of homes in a neighborhood. The use of this engine-generator unit may be activated for use in a localized section of the grid where electricity is not available.

Another embodiment for deployment of an SSI engine-generator unit may be to provide it in individual containers that could be delivered to a location and then connected.

A turbocharged light duty vehicle SSI engine may be a particularly attractive option for the set of engine-generators where minimization of space is an important requirement or where adjustment of engine speed over a wide range is used. Illustrative turbocharged engines may provide maximum mechanical powers of 250 to 500 hp. Engines that provide high maximum horsepower (for example, 400 hp or more) could be especially attractive in terms of space requirements and cost per hp. Another option for high horsepower engines is to use naturally aspirated engines. These engines may be larger and in order to provide the same power as the turbocharged engines, may employ 8 cylinders or more. The naturally aspirated engines could provide advantages of lower cost per hp and factory produced engines that can operate in a flexible fuel mode on either gasoline or ethanol or a combination of ethanol and gasoline.

The high efficiency SSI engines can operate for short periods of time at much higher power, near full power. This substantially increased power may be useful for times when the grid needs high power for short periods. For operation during other times, it may be generally desired to provide relatively high efficiency. In the case of a turbocharged engine, it would be possible to decrease power by decreasing the engine load (torque) over a wide range at an approximately constant engine speed without producing throttling losses that decease efficiency while maintaining the same engine speed. In this mode of operation, the generator is providing near the same frequency AC. Because the efficiency of a turbocharged engine is approximately constant in the region above open throttle, the efficiency of operation does not change when operating at loads that can be considerably reduced relative to maximum load. The turbocharged engine may thus provide a relatively wide range of power output at high engine speed and also provide high efficiency. This type of operation could enable operation at 3600 RPM for production of 60 Hz AC electricity.

In the case of naturally aspirated engines, operation at reduced load (torque) results in the need for substantial throttling, and will experience loss in efficiency because of throttled operation. Instead, it may be best to operate at lower engine speeds at relatively high torque, in which case the generator would operate at lower frequency (for example, at 1800 RPM to produce AC electricity).

It should be noted that for infrequent use of the SSI engines and low capacity factor operation (such as, for example, less than 10%), the efficiency of the engines may not be very important, especially when the engines are used to enable high penetration of non-dispatchable renewable sources which provide much more electricity per year than the SSI engines. However, low efficiency can increase the rate at which stored fuel is consumed.

DC Power Operation

The SSI engines may be operated at certain values of RPM (1800 rpm or 3600 rpm to provide 60 Hz AC electricity) from the generators that they power. 3600 RPM may be preferred for regular operation in order to obtain higher power for an engine of a given displacement.

It may also be advantageous for variation of engine speed to be used in adjusting the power at which the engine is operating. However, for typical AC engine generator designs, adjusting the engine speed would lead to varying frequency output of the generator rather than the required frequency of 60 Hz. To address this issue, the generator may be configured so as to produce a DC output by use of a rectifier. If needed, the DC output is then converted into 60 Hz AC using an inverter.

The engine-generators units can also be operated over a wide range of RPM and power levels by using rectifiers to convert the varying generated AC electricity into DC electricity. Conversion of the generator output into DC also facilitates synchronization of the electricity produced by the individual generators. When needed, the DC output can be converted into AC by use of inverters.

An alternative (or complementary) approach for enabling flexibility in engine speed is to use a mechanical transmission to convert the speed of engine crank shaft to the speed required by the generator for production of 60 Hz AC electricity. A transversely mounted transmission (configured so that it is perpendicular to the rotating shafts of the engine and the generator), such as those employed in front-wheel drive vehicles, may be particularly well suited because of the reduced space requirement relative to conventional transmission. Operating the generator at relatively high speed is advantageous in order to decrease the size/weight of the generator. Also, the size of transformers, if needed, is reduced by operating at higher frequencies. The transmission between the engine and the generator may be used to maintain the speed of the generator constant, irrespective of the speed of the engine. A continuously variable transmission (CVT) may be used. The engine-generator may also employ both a mechanical transmission and DC generator+ inverter operation; one use of this combined inverter and mechanical transmission approach may be to match the engine speed to the sweet spot of the generator.

Once coupled to the electric grid, the engines may be operated in such a way that the generator is used to adjust the engine speed. As the engine speed increases, the electrical load increases, slowing down the engine. At the lower loads, the generator speeds up the engine. Similarly, the engine/generator can be controlled by the phase of the relatively stiff power. In this case, it is possible to use AC generators that will self-adjust for frequency and phase. In order to parallel the startup of engine-generator units with the bus, they should be close enough in frequency and phase to avoid overcurrents in the starting generator. Once they are close in phase and frequency, the switch that adds the new generator set to the bus can be closed, and the generator will pull into synchronism with the bus. It may be difficult to achieve the matching when a large number of generator sets are connected in parallel. Thus, it is easiest (but at increased cost) to rectify the power from each generator before combining their output.

There is a tradeoff between the power and the RPM at which an engine is operated and its lifetime. Higher power and higher RPM operation will reduce lifetime but can be important for meeting greater electricity supply needs at selected times; and the engine lifetime decreases with an increase in the average power level at which the engine is used. Experimental and/or modeling information on engine lifetime as a function of RPM and power level at which the engine may be used to determine how much time an engine should be most advantageously used at various RPM and power level. This information may be employed to determine when high power, high RPM operation should be limited or an engine should be replaced.

The engines that are employed can be chosen so that the expected lifetime before engine replacement is roughly at least 5000 hours for regular, non-maximum power operation in a range between 30 and 60% of maximum power operation.

MMAE Augmentation of Power from OCGTs or Large Stationary Engines

Low-cost 3 MW capability modular power units using multiplexed multi-fuel automotive engine (MMAE) powered generators and producing maximum power levels in the 2 to 3 MW range may also be used to readily and cost effectively provide flexible augmentation of the grid load balancing that is provided by larger electric power sources (which produce power levels in the 30 MW to 700 MW range) such as aeroderivative or heavy duty OCGTs or large reciprocating engines. These larger sources also have longer replacement lifetime. This augmentation could be particularly useful for grid operation where gas turbines or large lean burn reciprocating engines have been installed and the need for additional long duration power is needed to due to increasing fraction of grid electricity provided by variable renewable electricity and/or increasing electricity supply shortfalls due the effects of global warming.

These multiplexed multifuel automotive-derived engine (MMAE) power modules may be used mainly or only for the periods of the highest power requirements for load balancing and could thus be operated with lower capacity factors than OCGTs or large lean burn reciprocating engines.

The MMAE power modules may act as low-cost peakers that add to the electricity produced by OCGT and large reciprocating engines. They may thus be either co-located with the higher power sources or situated in different locations. For example, the location of MMAE electricity generation systems could be more distributed than the OCGTs or large lean burn reciprocating engines. This may include locations at wind and solar power sources.

The MMAE power modules may also be added to provide faster start than the OCGTs and large reciprocating engines where needed (when used with OCGTs, where the cold start time is more than 100 times longer than for an MMAE power module).

The maximum power level capability of generation systems using MMAE power modules may be chosen by the choice of the number of MMAE power modules that are deployed. For example, 14 to 21 MW maximum generation system power capability may be provided by seven MMAE power modules and 140 to 200 MW generation system maximum power capability may be provided by seventy MMAE power modules.

The use of DC electricity could be used to facilitate synching of the engine generator units and the outputs of the power modules. The total power of the generator system for providing additional grid load balancing could be varied by turning individual engines and/or power modules on and off. These MMAE systems would be employing massive multiplexing of individual engine-generator units, which in some embodiments may include the use of at least 30 engine-generator units.

Using MMAE generation systems as an alternative to OCGTs or to augment OCGTs may also be advantageous because the MMAE NOx levels are lower than the OCGT levels.

MMAE Generation Systems in Combinations with Battery Systems

Because of their short response times, MMAE electricity generation systems can also provide ways for more cost-effective use of existing and new battery installations for grid reliability. In addition to providing the long duration supplementary power that cannot be affordably provided by batteries, MMAE systems may provide a lower cost substitute for battery use for producing medium duration supplementary power (such as, for example, for 0.5 hour to 4 hour durations). The low cost provided by the MMAE systems can allow existing and new battery installations to considerably shift battery storage utilization so to as to use their energy storage capability to provide more power for shorter medium durations with the longer medium durations being provided by the MMAE generation systems. For example, instead of being used for a maximum duration of 4 hours, the battery system may be used to provide more power for a maximum duration of 1 hour. The change in maximum duration of the battery system that is employed could depend on the cost of electricity per kWh from the MMAE system. The change in battery maximum duration could be varied inversely with the cost per kwh of electricity from the MMAE systems. MMAE systems using lower cost fuels could provide a greater reduction in the maximum duration for which the battery system would be used while still providing an economic advantage relative to batteries. The lower cost per kW of MMAE systems relative to large reciprocating engines and gas turbines enables a greater battery duration shift than could be obtained with these electricity sources. The shift in battery power duration can also vary with time and the amount of power needed from the combined battery plus MMAE generation system.

In addition, the fast response of MMAE systems (10 seconds or less for cold start to sweet spot operating power and 1 second or less for warmed up start) can be used as a way to provide a low cost short response time means for addressing grid power fluctuations. This capability can supplement or replace the use of battery power for providing very short duration (such as, for example, less than 10 seconds) grid stability applications.

The MMAE system can be also be employed as a means to shed excess grid power by using the excess grid electricity to pull a vacuum in the engine cylinder through a change in valve timing with no fuel being used and to make up for engine power loss due to friction.

In cases when the MMAE power generation is used to supplement a battery system, use may be made of the power conditioning system (the inverter) of the battery system to create AC electricity for distribution, avoiding the cost and space requirement needed to provide an inverter for the MMAE electricity generation. Depending on the conditions, the MMAE may provide power directly to the grid, and/or to the battery system (for battery charging).

MMAE powered generation systems may also be combined with supercapacitors or flywheels in addition to batteries in ways that could reduce cost by optimally using the fast cold and warmed up response times that MMAE systems can provide. These systems may provide cost reductions relative to the use of batteries without these other power sources.

The use of MMAE systems for obtaining grid stability for the range of very short through long duration power variations may be particularly important in regions of the world where low cost is an especially important factor.

The MMAE systems plus battery or battery plus flywheel or supercapacitor combinations described above may also be advantageously used in combinations with aeroderivative gas turbines or with heavy frame gas turbines including where the heavy frame gas turbines provide power levels that are greater than 100 MW. These MMAE combinations may also be advantageously used with large reciprocating engines.

In the same ways as discussed above, MMAE generation systems may also be combined with electricity from wind and solar power installations to provide firm power to the grid and therefore provide greater value. The DC power from the MMAE generation systems may be combined with DC power from the wind turbines and the total power converted into AC electricity.

Backup Power for Non Grid Use

In addition to reliability applications, optimized automotive-derivative engine powered generators may also play an important role in distributed electricity generation that is not connected to the grid. Maximum power levels of 300 kW provided by a single SSI engine-generator unit using an automotive-derived engine to a multi megawatt MMAE generation system may be used for backup power for hospitals, data centers, businesses and apartment buildings and water supply facilities in addition to generally larger systems for hospitals and data centers. The systems may be powered by either natural gas, (which has been proven to be more reliable source of energy than grid electricity) or by an onsite stored liquid fuel. Ethanol may be an attractive liquid fuel because of virtually no risk of ground and water contamination in contrast to gasoline and diesel and its higher flash temperature than gasoline. Ethanol could be stored in a building in contrast to propane. Corn based ethanol, which is produced in substantial quantities in the US (around 15 billion gallons per year) can also provide the advantage of being a low carbon fuel (with a carbon intensity that is 25 to 40% lower than diesel fuel).

Use of very high concentration ethanol with only a small amount of denaturant (for example, greater than 95% ethanol) may be needed to achieve the desired elimination of ground contaminant threats.

Cold start of the engines may be difficult for these high ethanol concentrations. The use of a reformer to convert some or all of the ethanol into hot hydrogen rich gas may address this issue. A plasma enhanced reformer can be particularly well suited for this purpose. One reformer can be used per container power module, or one reformer per engine-generator unit. The hydrogen-rich gas from the reformer can be fed into a multiplexed engine—generator system with the inlet air. Alternatively, it can be introduced into the inlet manifold of each engine, with a single injection point, or with several engines, one injection point just upstream from the inlet valve/valves of each cylinder. The reformer may be used for a period during the start up phase. It can last from 1-2 seconds, to as long as 10-20 seconds. The reformer operates with an air fuel mixture where lambda is 0.6 or lower. Temperature of the hydrogen rich gas will be over 700 C, and as high as 1000 C. Alternatively an ethanol-gasoline mixture such as E85 could be used to meet the requirement for reduced cold start emissions.

A decentralized backup power source could have its own storage tank of liquid fuel that could be readily refillable by a tank truck.

A preferred multiplexed set of SSI engines could be one that operates on natural gas, if available, and can also operate on stored liquid fuel. The liquid fuel would preferably be ethanol or an ethanol-gasoline mixture such as E85 for the reasons described above. Capability for operation on propane and gasoline could also be provided. Like ethanol, propane has the advantage of not producing soil or water contamination.

The same multiplexed SSI engine system that may be used to provide backup power directly to an electricity consumer may also be employed to provide backup power for the grid when there is a grid electricity supply shortfall.

SSI Engine Powered Generator Plus Battery Systems

For some applications, a single SSI engine powered generator may be combined with a battery to provide faster startup than the fast-start (less than 10 seconds and preferably less than 5 seconds) of the SSI engines. The faster start-up time of the automotive-scale SSI engines relative to the startup time of large lean burn reciprocating engines (with one MW power output or more) and startup times of around 45 second or more using preheating and prelubrication or to startup time of OCGTs (with startup times of 600 seconds) can reduce battery cost and can provide a large reduction in the space/weight needed for batteries that are used to provide faster startup In addition, the combination of a high efficiency SSI engine powered generator (which is operated with an open throttle) with a battery can provide a means to provide high levels of peak power when needed while also providing lower levels of power for longer periods of total amounts of time. The battery may store the electricity has been produced using high efficiency open throttle engine operation and then release it at a lower power level over a longer period of time. The ratio of peak power to average low power operation for a longer period of time may be greater than a factor of ten.

One advantage of this SSI engine+battery system is to provide higher overall fuel to electricity conversion efficiency when very low power is called for by the electricity user. Another advantage is the longer time before the engine has to be replaced when it is used in engine+battery system lifetime since the battery provides electricity for long periods of time when the engine is off, or minimizes the full power operation (or high power operation) of the engines. The engine-battery system lifetime (hours of operation of the engine+battery system before engine replacement) can be considerably larger than the engine lifetime (for example, more than three times and preferably more than ten times longer longer).

The advantages that are described above for a single SSI engine powered generator could be provided by a set of multiple SSI engine generators.

The time duration of battery discharge which may be used is based on the power that is to be provided by the battery and the kWhr energy storage of the battery. The shortest time of discharge (in other words, the highest power) is determined by the nature of the batteries: for lithium ion batteries, for example, the fastest rate of full energy discharge is about half an hour. The kWhr energy storage would be limited by cost.

SSI Engine+Battery Systems for Fast Electric Vehicle Charging and Stationary Power One application of an SSI engine-generator unit plus battery system is for rapid charging at home (or at a business or other entity) of an electric vehicle battery, referred to as the "vehicular battery", either infrequently or on a regular basis (because of the convenience of rapid charging), or as backup charging when there is a grid outage; and for also providing charging of a battery, referred to as the "stationary battery", at a home, business, industrial facility or other entity. The stationary battery provides much lower power electricity for the entity when needed, such as when there is a grid power outage. This system is shown in FIG. 1. The engine generator set 100 provides power which can be AC electricity to a power conditioner 110. The output of the power conditioner 110 is then used to charge the vehicular battery 120 and/or the stationary battery 130. The output of the stationary battery 130 is then provided to a second power conditioner 140, which then supplies electricity to a stationary load 150.

For example, a multi-fuel SSI engine powered generator may provide rapid vehicular charging power the 50-250 kW range (operating at for example 80-100% of maximum power) and may also provide power for stationary use when needed for a power outage where the power is required at a much lower average power level (for example, 0.5 to 3 kW) using the energy storage in the stationary battery 130. The power that is provided by the stationary battery 130 could be used for backup power when there is a grid power outage and/or for other applications.

As is the case with all of the embodiments in this application, a multi-fuel SSI engine used for fast charging of a vehicle battery and stationary power can use a combination of an SCR with a three-way catalyst for NOx reduction that has been described previously. The engine could be fueled with presently available fuels such as natural gas, propane, ethanol or ethanol-gasoline mixture including E85 or with emerging low-carbon fuels (such as hydrogen, methanol or ammonia) or combinations of these fuels.

The stationary battery 130 may be charged at substantially higher power than the average power that it provides. For example, the stationary battery 130 may be charged at a power level that is 25 to 50% of the maximum power that is provided by the engine-generator unit. 25% is roughly the lowest percent before efficiency loss from throttling would begin for a turbocharged engine and 50% is the lowest percent before efficiency loss due to throttling would begin for a naturally aspirated engine. For a 100 kW maximum power generator, this charging power for a naturally aspirated engine would be in the 25 to 50 kW range. This mode of operation avoids operating the engine at the low power required by the stationary load, which would result in very inefficient operation.

For charging of the vehicular battery 120, the engine within the engine-generator set 100 may preferably be operated with an open throttle to obtain high efficiency and high RPM (at least 3600 RPM and preferably at least 5000 RPM to maximize generator power output during the vehicle charging period). Varying engine RPM and power could be obtained by allowing the generator RPM to vary with the engine RPM and thus varying frequency of electricity produced by the engine-generator set 100.

Figure 2:
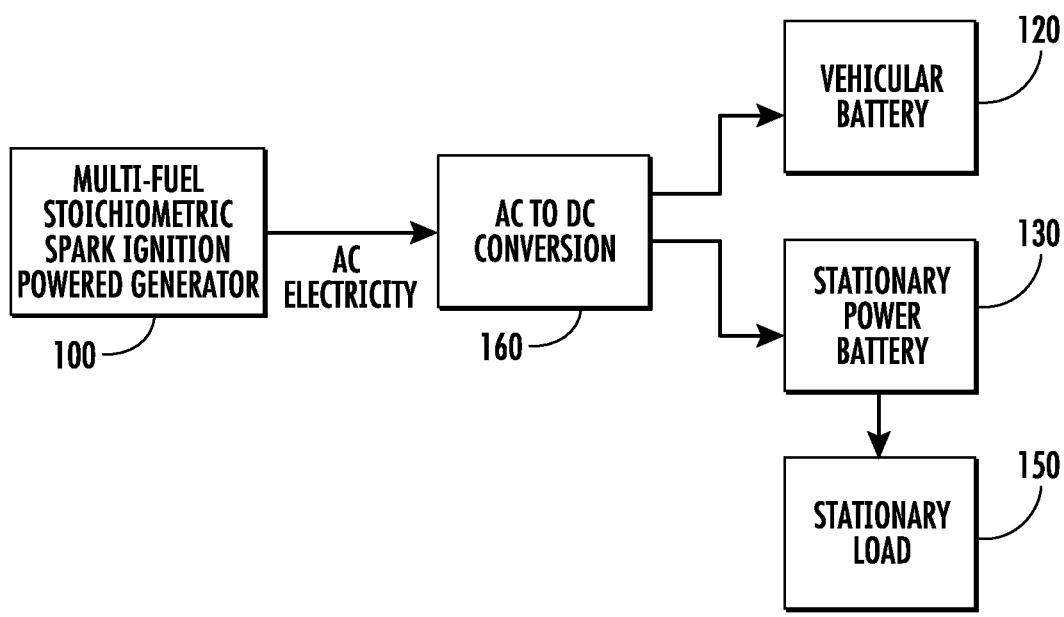
FIG. 2 shows a stoichiometric spark ignition engine powered generator used to provide DC electricity which is used to provide fast charging of a vehicle battery and a stationary battery which is used to provide stationary power.
Figure 3:
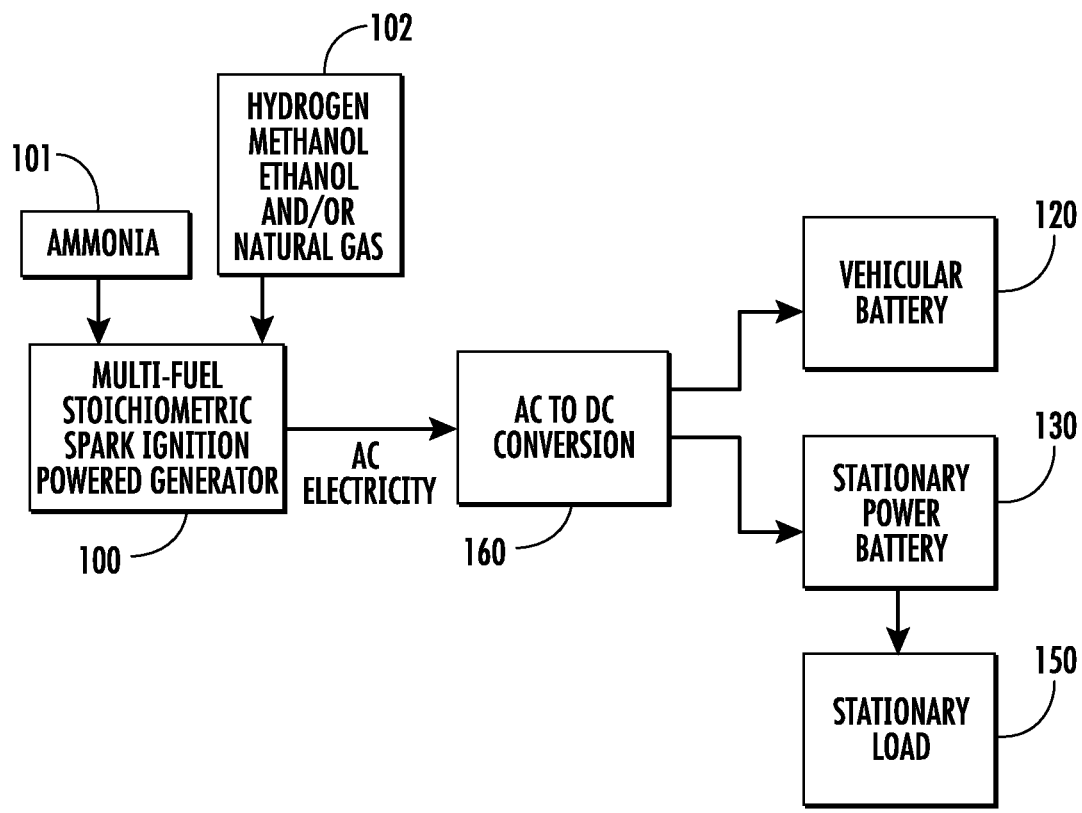
FIG. 3 shows the stoichiometric spark ignition engine powered generator system of FIG. 2 where the spark ignition engine is powered by ammonia and one of hydrogen, natural gas, methanol or ethanol.

In some embodiments, shown in FIG. 2, this electricity may be rectified and converted into DC power using an AC to DC converter 160. The DC power may either be used directly to charge the vehicular battery 120 and/or stationary battery 130, or converted into AC if needed by use of an inverter. FIG. 3 is similar to FIG. 2, but shows that the engine-generator set 100 may be powered by ammonia 101 or one or more of hydrogen, methanol, ethanol and/or natural gas 102. It can also be powered by an ethanol-gasoline mixture including E85.

When the engine is used to charge the stationary battery 130, it can be operated at a lower power and for a much longer time than when it is used for fast charging the vehicular battery 120. The reduced power for charging of the stationary battery 130 can be obtained by operation at lower RPM. Lower RPM operation can provide a means of reducing the power level without reducing efficiency by throttling losses. The average power level provided by the engine generator 100 to the stationary battery 130 would generally be in the range of 20 to 50% of the maximum power provided by the engine-generator 100.

A typical time interval for recharging the stationary battery 130 (the duration of battery storage) is determined by the energy capacity of the stationary battery 130. For example, for 1 kW average home power use, 1 kWhr stationary battery requires recharge every hour. For a $500/kWhr to $1000/kWhr total battery cost, the battery cost is $500-$1000 for a one hour time interval between recharges of the stationary battery 130. For an 8 hour interval between battery recharges, the cost of the stationary battery 130 may be between $4000 and $8000. Desirable time intervals between recharges of the stationary battery 130 could be generally be between 1 and 8 hours.

Because of the very different power required for fast charging (for example, 50-250 kW) and the power required for continuous operation of a home or other entity, it could be advantageous also use the SSI engine generator to fast charge the stationary battery 130 (although generally a less fast charge that employed for the vehicular battery 120). In this case, the duty cycle of the engine-generator 100 may be very low. For example, if the average electricity use of a house is around 1 kW and the charging power for stationary battery 130 is 100 KW, the duty factor of the engine is 1%. A representative set of duty factors for use of the engine—generator to provide steady stationary power through the battery is between 1 and 5%.

With this low duty factor range, the replacement time for the engine based on its use for producing the low stationary power levels through the means of the stationary battery power is between 20 and 100 times the lifetime of the engine. For a 5000 hr lifetime of the engine, this replacement time could be greater than 20 years.

The size of the stationary battery 130 determines the time between engine startups, as well as the engine generator on-time. If the battery is small, it requires frequent engine-generator turn-on, with short operation until the battery is charged.

The size of the stationary battery 130 may be determined by avoiding the increased noise of frequent startups of engine to charge the stationary battery. A battery that has a larger amount of storage than 1 kWhr would be useful to have a time between stationary battery recharging of between 4 and 12 hours. The energy storage capability of the battery may generally be in the 4 to 12 kWhr range and the cost of the battery may be between $2000 and $6,000 for an installed battery cost of $500/kWhr and between $4,000 and $12,000 for an installed battery cost of $1000/kWhr.

Figure 4:
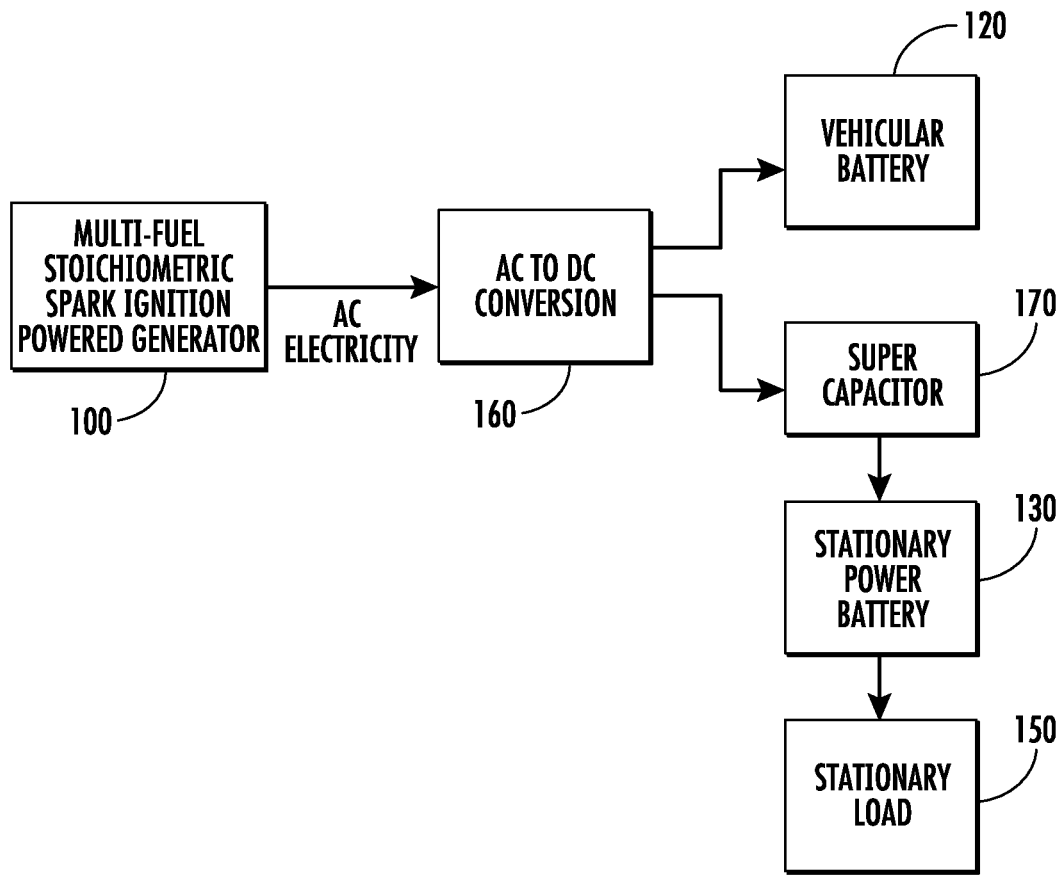
FIG. 4 shows the embodiment of FIG. 2 with a supercapacitor.

The characteristics of the stationary battery 130 may be such that its charging rate should be limited. In this case, it could be useful to have a component between the engine-generator unit 100 and the stationary battery 130 that can reduce the rate of charging of the stationary battery 130. For example, as shown in FIG. 4, a supercapacitor 170 could be charged with high power (but not much energy) from the engine-generator unit 100. Once charged, the supercapacitor 170 may then be used to charge the stationary battery 130, at a reduced charging rate. In this case, the supercapacitor 170 is a buffer between the engine-generator unit 100 and the stationary battery 130, allowing slow charging of the battery while maintaining high power use from the engine-generator unit 100. The frequency of start-up and shut down would, of course increase.

There may be occasions when the vehicular battery 120 is being charged and at the same time, there is need for charging the stationary battery 130. In these occasions, the stationary battery 130 may be charged at a slower rate.

The charging system is capable of recharging the stationary battery 130 at the same time as the stationary battery 130 is supplying power. It is possible to disconnect the stationary battery 130 from the stationary load 150, and instead use the engine generator 100 itself to provide the power, while at the same time recharging the stationary battery 130. Alternatively, it would be possible to recharge the stationary battery 130 while the battery is still connected to the stationary load 150.

Figure 5:
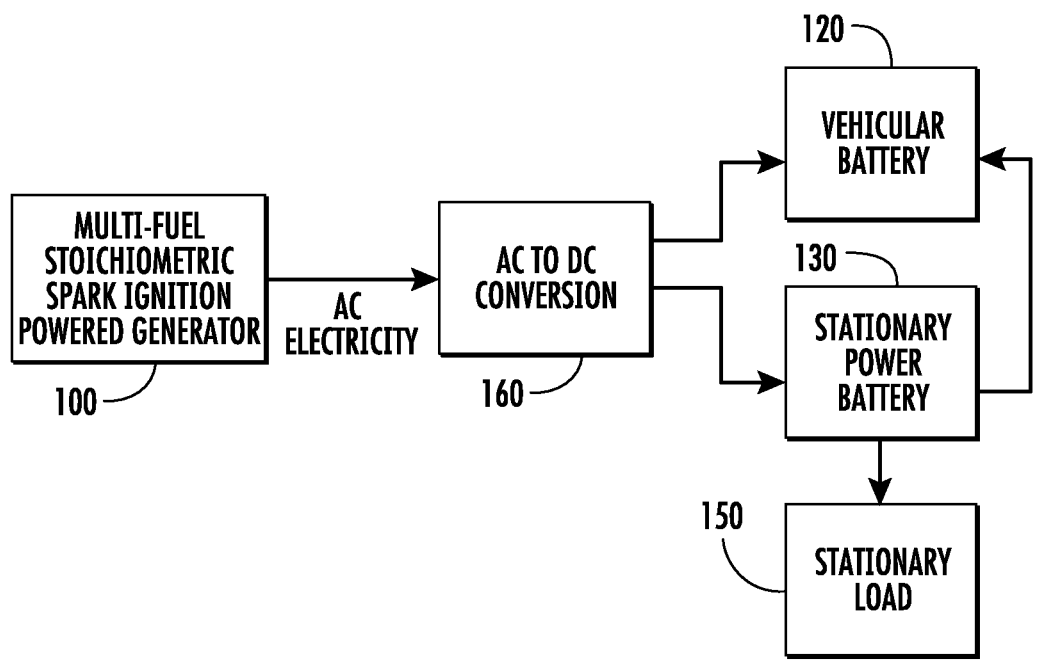
FIG. 5 shows the embodiment of FIG. 2 where the stationary battery can be used to charge the vehicular battery.

In addition, it would be possible to use the stationary battery 130 to charge the vehicular battery 120 at a low rate of charging. In this configuration, the engine generator 100 may quickly charge the stationary battery 130, and the stationary battery 130 then charges the vehicular battery 120 at low rate. The engine generator set 100 could still be turned on periodically to fast recharge the stationary battery 130, for a period determined by the battery size and the power for the engine generator. Alternatively, the stationary battery 130 can also be charged by power from the grid at times of low electricity costs, and used to recharge the vehicular battery 120. This configuration is shown in FIG. 5. In this case, the size of the stationary battery 130 is larger than that which would be required to satisfy the stationary load 150.

The buffer between the high power from the engine-generator set 100 and the stationary battery 130 may also be provided by other technologies, such as magnetic storage or a fly wheel. The frequency of the buffered system for transferring high power from the engine-generator set 100 to the stationary battery 130 by using a supercapacitor, magnetic storage unit or flywheel may typically be between 5 minutes to 60 minutes.

A control system (not shown in the figures) may be used to determine the power level (e.g., the kW level) at which the vehicular battery is charged. This power level may be varied and set by the user of the charging system. The control system may vary the power level by varying the speed of the engine. The engine may be operated at open throttle while the engine speed is varying. The control system may also indicate to the user what fraction of full battery charge is being obtained as the user's vehicle is being charged. The control system may also provide the user with the capability to vary and set the frequency of charging the stationary battery and the power level at which it charged. The power level at which the stationary battery is charged may be varied by varying the speed at which the engine is operated while the engine may be operated with an open throttle. The control system may also allow the user to utilize different fuels for the fueling the engine. It may also indicate the price and greenhouse gas impact of using the different fuels. A choice of two or more fuels for powering the engine may be given. These fuels may include natural gas, propane, ethanol, an ethanol-gasoline mixture, gasoline, hydrogen, methanol or ammonia.

In addition to providing back up power for a grid outage, the engine-generator plus battery system could be used for providing both fast electric vehicle charging and full time power for home or other entity use; that is, it could provide complete off grid capability. For this capability, a larger battery at the home or other entity would be provided. An illustrative range of energy storage for this battery may be 4 to 12 kWhr.

The capability for complete off grid charging of electric vehicle batteries and providing stationary power is facilitated by the long period between engine replacements which is enabled by low duty factor recharging of the stationary battery 130 and low capacity factor charging (such as less than 5% capacity factor and preferably less than 3% capacity factor) of the vehicular battery 120.

For this non-grid capability, the engine power for charging the stationary battery 130 could be higher than for the backup home power application in order to obtain a higher ratio of the lifetime for the engine+battery system before engine replacement to engine replacement lifetime. For example, the engine+battery system could be charged with a power level of the engine-generator of 250-400 kW, whereas the electric vehicle charging could be carried out in with 100-150 kW. The engine operating for short periods at very high power has a shorter lifetime than one that generates the same energy at lower power, for a longer period. The effect of higher power in reducing lifetime may be taken into account in optimizing the overall system.

The SSI engine for the engine-generator+battery system described above could be fueled with presently available fuels that include pipeline natural gas, biogas or with a stored liquid fuel such as propane, ethanol, an ethanol-gasoline mixture such as E85 or a mixture of one of these fuels with another liquid fuel. Corn based ethanol from state of the art biorefineries in the US may provide carbon intensity reductions of around 20 to 40% relative to diesel fuel and to natural gas and is produced in the US at a substantial level (around 16 billion gallons per year).

As liquid fuels with low carbon intensity (low greenhouse production) become available, future liquid fuels for powering the SSI engine include methanol, or ethanol from biomass and municipal solid waste. In addition, low-carbon corn-based ethanol may also be provided by carbon capture and sequestration of $CO_2$ from biorefineries.

Because of their high knock resistance, especially when the directly injected, the use of ethanol or methanol either as the entire fuel or together with another fuel which has lower knock resistance can be used to allow operation of an engine with higher level of turbocharging or supercharging and/or compression ratio. The higher level of turbocharging or supercharging can be used to substantially increase the maximum power of a given displacement engine.

The use of ethanol (or an ethanol-gasoline mixture such as E85) or methanol could be employed to increase the power of a turbocharged SSI engine by a factor of 1.5 to 2.5 over what could be obtained with a different SI fuel. This increase may also be facilitated by a modest decrease in compression ratio. This increase in power output can be used to reduce engine cost per unit power charging capability by allowing use of a smaller engine for given charging time or to reduce the charging time for a given size engine. It could also enable the use of a single engine to be used to charge more than one electric vehicle at the same time, thereby reducing engine cost. Turbocharged spark ignition engine powered generator levels of 500 to 700 kW may be provided by a single engine and may be used to charge two to three vehicles at one time. When used together with another fuel, the introduction of ethanol or methanol to the engine may be separately introduced so as to only be used when and in the amount that is needed to prevent knock at high torque. Water injection could also be used in this way.

The engine powered generator+battery systems for vehicle charging and stationary power that are described above could also be employed in combination with variable renewable electricity provided by solar or wind power. The variable renewable electricity could be used in combination with the MMAE generator to charge the stationary battery 130 and thereby reduce fuel consumption and increase the low-carbon energy content of the fuel that is used for charging the stationary battery 130. The variable renewable electricity could also be employed to allow a greater amount use of the MMAE generator for vehicle charging.

A multi-fuel engine power generator+battery system for vehicle charging and stationary power would generally use a three-way catalyst so as to produce low NOx and hydrocarbon emissions. It may initially be generally fueled with natural gas (because of its availability and low cost) with the option for using ethanol, propane or gasoline. The other fuels may be used when natural gas is not available and in the case of ethanol when it is desired to use a fuel with reduced carbon intensity. The engine may be a turbocharged or naturally aspirated engine that is run at varying RPM levels with varying AC frequencies that are produced by the grid and converted into DC by a rectifier. As low-carbon liquid fuels, such as ethanol, an ethanol-gasoline mixture, methanol, ammonia and DME, become available, they could be used The SSI engine generator may be designed to operate with higher efficiency by exhaust waste heat recovery when methanol, ammonia, ethanol or an ethanol-gasoline mixture are used. When these fuels are used, there may be conditions where the overall greenhouse gas emissions would be lower than for electricity provided by the grid. The SSI engine generator+battery systems may be installed at service stations that provide gasoline and ethanol or at other locations as well as at individual residences. A multi-fuel engine generator may also be advantageously sited at located which had a propane tank for heating (and/or cooking).

The engine-generator+battery system described above may be used with a multiplexed multi-fuel automotive engine (MMAE) power generators as well as with single automotive engine powered generator units.

There are different fueling embodiments for the multi-fuel SSI engine-based vehicle charging and stationary power system depending on the objectives of the system.

The broadest capability may be where the multi-fuel home or business vehicle charging and stationary power unit could be powered by ethanol, gasoline or a mixture of ethanol and gasoline from one tank or two different fuel tanks, propane from a separate fuel tank and/or natural gas from a pipeline. Use of ethanol may provide a means to reduce greenhouse gas emissions and to increase engine performance or efficiency by providing greater knock resistance. It may have very low NOx emissions (less than 0.05 g NOx/kWhr) by using a three-way catalyst exhaust treatment system.

For locations which do not have access to pipeline natural gas, the multifuel automotive engine may be fueled by ethanol, E85 and/or propane which are presently available fuels that can be transported to the generation site as liquids. The ethanol or E85 has the advantage of reducing greenhouse gas emissions using present corn-based ethanol and a longer-term potential of further reduction using corn ethanol plus carbon capture of the $CO_2$ produced in biorefineries. It also has the advantage of providing high knock resistance, thereby increasing engine power and/or efficiency. In addition, flexible fuel ethanol-gasoline SSI engines that are presently available in production vehicles could be employed. These engines could be operated on ethanol alone, a range of ethanol-gasoline mixtures (such as E85) or gasoline alone. If desired, the same fuel storage tank could store both ethanol and gasoline or two storage tanks could be employed.

The greatest robustness may be obtained by having capability to operate the engine on either propane or ethanol. A variation of this option would be to use separately controlled injection of propane and ethanol where the ethanol to propane ratio is sufficiently high to prevent knock as torque increases. This may allow higher engine power and efficiency. Different ethanol/propane ratios could be used for vehicle charging and stationary battery charging.

In one embodiment, this vehicle charging and stationary power unit would be the SSI engine+battery systems with the parameters given above.

This type of multi-fuel engine could also be used in the grid reliability and other non-grid backup power applications described above.

For some vehicle charging and stationary power applications, it may also be attractive to use compression ignition engines powered by diesel fuel, renewable diesel, biodiesel or FT diesel fuel. These engines would preferentially be capable of high RPM operation as described earlier.

An illustrative embodiment of an SSI multifuel engine powered generator system that may be used for charging of light duty vehicle is a system that provides 75 kW of vehicle charging power at a commercial entity or home. This charging power is similar to the 72 kW power level provided by present Tesla fast charger at highway locations such as large rest stops. This type of SSI engine powered generator system may be used with engines of different power levels for providing different light duty vehicle charging levels (such as, for example, vehicle charging capabilities between 50 and 300 kW).

A system with a 75 kW charging capability could provide 100% charging of a 75 kWhr energy storage battery (which is representative of the battery in a car) in around one hour. This is around ten times faster than present 7 kW level home chargers using grid electricity. One quarter charging (which could provide a range of around 75 miles) could be obtained in 15 minutes.

The SSI engine powered generator may also be used to provide charging of a stationary battery which provides a low average power level of home use (for example, 0.5 to 2 kW) or business use and which rapidly responds to variations in stationary power needs (such as the power for an air conditioner or a refrigerator). The battery energy storage and recharging of the battery by the engine is optimized for various cost and engine operation frequency requirements. For businesses, systems of multiple SSI engine generators may be used to simultaneously charge more than one vehicle and to provide higher stationary power levels.

Propane and/or ethanol or ethanol mixtures with gasoline (such as E85) are presently available liquid fuels that can be particularly attractive for near term use in the SSI engines, especially where pipeline natural gas is not available.

The fuel flexible SSI engine powered generators can be used in any number of embodiments that employ propane. Propane could be used by itself or in mixtures with DME. DME can provide greenhouse gas reduction when produced from waste, biomass, $CO_2$ and/or renewable electricity.

In addition to operating with propane or propane-DME mixtures alone, the SSI engine powered generators can also operate on ethanol or ethanol gasoline mixtures (such as E85) alone. They may also use propane or propane-DME mixtures together with ethanol or ethanol-gasoline mixtures. The combination of ethanol or ethanol-gasoline mixtures with propane or a propane-DME mixtures can provide increased knock resistance, which may be used to enable greater power production in a turbocharged engine.

Propane-DME mixtures or ethanol or ethanol mixtures can also be used in SSI engines which can also be fueled with natural gas or by natural gas in combination with these fuels. These engines may also be operated with gasoline.

Ethanol provides the advantage of reduction of present greenhouse gas emissions using state-of-the art corn-based ethanol. The carbon intensity of corn-based ethanol, which is a measure of greenhouse reduction that results from its use, is around 20 to 40% less than gasoline or diesel. Moreover, future ethanol carbon intensity reductions are possible with capture and sequester or use of the $CO_2$ produced in ethanol refineries. The $CO_2$ may be used for enhanced oil recovery. Another use of the $CO_2$ may be for combination with hydrogen (from electrolysis; pyrolytic conversion of natural gas to hydrogen and elemental carbon; or another source of hydrogen) to make methanol.

An SSI engine powered generator may be fueled with methanol produced from the $CO_2$ from the ethanol refinery. This methanol may be used in the SSI engine powered generator in addition to or as an alternative to the ethanol produced from the biorefinery. Alternatively, the methanol may be sold as a chemical or chemical feedstock. Another option is to produce electricity near or at the biorefinery using an MMAE powered generator or set of MMAE powered generators that are powered by the methanol that is produced the biorefinery. The electricity may be used at the refinery or exported for use elsewhere.

Higher efficiency use (super-high efficiency engine operation) of the ethanol and/or methanol that is produced from a biorefinery or from other means may be obtained by use in a spark ignition engine that is operated with a stoichiometric fuel air ratio or substantially stoichiometric fuel air ratio and uses exhaust gas reforming to recovery energy from waste heat. Waste heat in the engine exhaust (and in some cases other waste heat) may be used to endothermically convert the methanol or ethanol into hydrogen-rich gas (a gas that includes hydrogen and carbon monoxide), which is has more energy content than ethanol or methanol. Use of exhaust heat reforming could boost the energy conversion efficiency to greater than 50%. As part of this process, exhaust heat may also be used to drive a turbine which produces additional electricity.

A reformer can be used to facilitate cold start when the engine is operated with an alcohol (ethanol or methanol) or an alcohol-gasoline mixture. The reformer converts the ethanol or an ethanol-gasoline mixture into a hot hydrogen-rich gas. The reformer may use a plasmatron to provide better conversion into hydrogen-rich gas.

Costs for the SSI engine powered generators can be kept low by using modestly modified mass-produced light duty automotive engines in combination with generators produced from low cost mass produced electric components for electric cars (such as motors for electric cars).

The cost per kW can also be kept low by generally operating the engine at relatively high RPM and power (such as, for example, operation at an average power of 50 to 70% of maximum engine power) and use of a stoichiometric fuel/air ratio or substantially stoichiometric fuel air ratio. Operation at an optimal RPM and optimal power level (defined as the power level that provides a desired engine lifetime and/or efficiency) can be facilitated by allowing the choice of a desired engine RPM and frequency of electricity from the generator to vary and then rectifying it to produce DC current.

For 75 kW of charging power, the charging time may be around ten times faster than the present home charging using grid power (which is in the 7 KW range). Full charging may be done in around an hour and one quarter charging could be provided in around 15 minutes.

Use of a three-way catalyst together with a stoichiometric or substantially stoichiometric fuel/air ratio in warmed up operation may be used to reduce NOx emissions to 0.05 g/kwhr and preferably at or below 0.03 g/kWhr. In order to decrease nitrogen oxide emissions (NOx) emanating from the three-way catalyst when the engine is started for charging the vehicle battery or the battery used for providing the stationary power, the three-way catalyst is first heated to a desired temperature when engine operation is called for. The higher temperature increases exhaust control effectiveness. When the desired temperature has been reached, a temperature sensor then allows the engine to be started.

In addition, an enhanced ignition system can be used to further reduce NO emissions by providing enhanced combustion stability and facilitating use of heavy EGR (such as EGR>25%). The heavy EGR reduces NOx emissions. Higher energy ignition may be provided by a stronger electrical discharge than a conventional spark plug (such as a plasma that provides more power, energy and/or discharge size than a conventional spark plug). Enhanced ignition may also be provided by an alcohol (ethanol or methanol) fueled prechamber. The alcohol that is used in the prechamber can be the same fuel that is used in the engine or a different fuel.

When SSI engine power is needed for stationary power, the MMAE would be operated every 6 to 24 hours to recharge the battery that is used to provide the home power. For an average home power need of 1 KW and a typical recharging interval of 6 to 12 hours, the battery energy storage capability may in the range of 6 to 12 kWhrs. If desired, the recharging interval could be extended up to 24 hours.

For 1 kW of average stationary power production, the ratio of vehicle charging power to average stationary power for 75 kW of charging power is 75 to 1. The 75 kW charging power system may also be used with higher average power production by using longer battery recharging times and having a lower ratio of electric charging power to average stationary power. For example, for 2 kW average power use, the ratio of charging power to average stationary power would be 35 to 1. Illustrative ratios of charging power to average stationary power would be between 300 and 30 to 1.

In addition to the fuels described above, SSI engine systems may be configured to operate on hydrogen or ammonia. A pre-chamber that uses alcohol may be used to provide faster flame speed for ammonia operation.

As an alternative to being a modified version of a spark ignition engine, the SSI engine could be a modified version of a vehicular or non vehicular compression ignition engine that could operate on diesel fuel, renewable diesel or biodiesel and/or DME. In addition, the DME could be the sole fuel or could be combined with natural gas, ethanol or gasoline.

Compression ignition of DME (or diesel, renewable diesel or biodiesel) could be used to ignite a larger amount of another fuel (such as natural gas, propane, ethanol, an ethanol-gasoline mixture, gasoline, hydrogen, methanol or ammonia or a mixture of these fuels) and to operate the engine with a stoichiometric fuel air mixture. These other fuels are low cetane fuels that are used in spark ignition engines. This technique may be used in a modified compression ignition diesel engine.

An SSI engine system using a high power engine (250 kW maximum power or above) may be employed to charge two to three vehicles simultaneously. For example, a 300 Kw engine could be used to provide charging power of 160 kW at 60% of maximum power (and 90% mechanical to electric conversion efficiency), thereby providing 80 kw of power to two vehicles simultaneously or 160 kW to one vehicle. Faster charging at higher percentages of maximum engine power could also be obtained for a modest fraction of total charging time without having an unacceptable impact of engine lifetime.

An SSI engine system may also be used for fast charging heavy duty trucks and other vehicles and other vehicles with much larger battery storage levels (such as greater than 400 kWhr) than light duty vehicles. In this case, MMAE-based systems may be used to provide vehicle charging levels of 300 kW or more. These charging levels may be provided by using two MAE engine generators to provide power levels of 400 to 800 kW. They may also provide average stationary powers that could be in the 10 kW to 20 kW range.

Automotive-derived engines and exhaust has been optimized for noise abatement. Slightly modified systems can be used to minimize the noise, if it is desired. Noise can be reduced by operating the engine mainly at a constant value of RPM. Automotive components (mufflers and other components) can be used to reduce the cost of noise reduction.

An SSI engine powered generator system can also be used in combination with solar power. The stationary battery can be charged by solar power, by MMAE power or by both. The use of solar power reduces the carbon intensity of the overall home or business energy system and also provides additional backup power. A control system may be used to substitute solar power for some of the MMAE power used in vehicle charging and charging the battery for providing stationary power.

SSI engine power generators may also be used with ethanol or methanol which is also used as a means of fueling a furnace for home heating and serves a lower carbon intensity substitute for present home heating oil.

There can be synergy between the electricity produced and thermal energy (Combined Heat and Power, CHP). There are two ranges of temperatures from the engine system, one associated with the engine cooling (water system) and a second one associated with the exhaust, producing much higher temperatures. Roughly, ⅓ of the combustion energy goes each to the water coolant, to the exhaust and to power. In the case when the system is being used for recharging stationary batteries, the exhaust heat can be stored in units for use in stationary applications, either for heating or hot water supply. The lower temperatures can be stored in water (for example, heating a hot water tank). Higher temperatures can be stored in solids, phase changing materials or higher temperature liquids/salts. If the electricity is being used for backup and/or emergency, having a simultaneous supply of thermal energy may be useful.

The SSI powered generator plus battery systems described above could be installed to provide fast electric vehicle at regular service stations and at highway rest stop locations that would continue to dispense liquid fuels (such as gasoline, gasoline-ethanol mixtures including E85, and diesel) for transportation. Propane storage may be added at these facilities.

The stationary power provided by SSI generator system may be used as backup power to run the fuel pumps and meet other electricity needs of these facilities. The ethanol or ethanol-gasoline mixtures may be stored in some of the fuel storage tanks that are at these facilities.

As they become available at a sufficient scale at an affordable price, low-carbon methanol and ammonia may also be used as fuels for flexible SSI engine powered generators located at service stations and highway rest stops.

The SSI engine generators at these facilities may also provide backup or supplementary electricity to the electricity provided by grid. In certain situations, they may provide electricity with a lower carbon intensity than the electricity provided by grid. In addition to the lower carbon intensity that could come from the reduced carbon intensity of fuel, it also come from the use of super-high efficiency engines using the exhaust energy recovery from alcohol fuels that was described above. These engine-generator systems may be used either individually or in combinations (preferably multiplexed combinations which provide advantageous of combinations, such as but not limited to sharing of components).

In addition to deployment as stationary systems, the SSI engine powered fast charging plus battery systems described above can also provide mobile fast charging and stationary power service by installation in self-propelled vehicles or in containers hauled by vehicles. The SSI powered generator in the vehicle or in a trailer can also provide the electricity to move the vehicle using electric motors. One mode of operation of the vehicle is in series hybrid configuration. The fuel for the fast charging and stationary power can be at least one of propane, ethanol or a mixture of ethanol and another fuel or an additive, gasoline, natural gas, or hydrogen. This can be particularly useful for emergency situations. Larger fuel tanks than would normally be used for vehicle propulsion may be employed. The larger fuel tank may be carried in a trailer.

The SSI engine powered generators described above may also be used in multiplexed combinations for producing larger amounts of power for the applications described above and also for other applications.

For some embodiments, the engine powered generators described above may only be used for fast vehicle charging and no stationary battery will be provided; or if a stationary battery is provided, it will not be employed.

While the disclosure describes the uses of MMAE systems, it is understood that in some embodiments that are described for MMAE systems, the generation of electricity may be provided by a single engine using the fuels described above. These embodiments may utilize a single MAE (multifuel automobile engine) which is also referred to an SSI engine.

Additionally, while the disclosure describes the use of automotive spark ignition engines, it is also understood that, through the use of prechambers, it is possible to create stoichiometric fuel/air ratio spark ignition engines that are modifications of engines that are not automotive spark ignition engines.

Examples of these engines that are not spark ignition automotive engines include but are not limited to compression ignition diesel engines that are modified to use spark ignition and operated with a stoichiometric fuel/air ratio. These compression ignition diesel engines include engines used for vehicles, marine propulsion and stationary power and may have cylinder sizes that are larger than automotive engines. Other examples may also include spark ignition engines that have larger cylinders than automotive engines. In addition to use for powering generators, modified version of these compression and spark ignition engines so that they use stoichiometric spark ignition operation may also be used for applications that do not use the engines to power generators. These applications include but are not limited to vehicular propulsion and marine propulsion.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An engine powered generator that uses a modified automotive engine that is operated with a stoichiometric fuel/air ratio;
   wherein the engine powers a generator that provides charging of a vehicle battery;
   wherein the engine powered generator also provides charging for a stationary battery that provides electricity for stationary use at a lower power than is provided for vehicle battery charging;
   wherein AC electricity from the generator is converted into DC electricity;
   wherein the speed of the engine is varied together with the electric power that is used for vehicle charging and for charging of the stationary battery; and
   wherein the engine is fueled by at least one of at least one of natural gas, propane, ethanol, an ethanol-gasoline mixture, gasoline, hydrogen, methanol or ammonia.

2. The engine powered generator of claim 1, wherein the engine is fueled by E85, by propane, or by propane and E85.

3. The engine powered generator of claim 1, wherein the engine is fueled by natural gas, by E85, or by a combination of natural gas and E85.

4. The engine powered generator of claim 1, wherein the engine is turbocharged and engine power is increased by use of E85.

5. The engine powered generator of claim 1, wherein the engine is operated with a power density that is between 50 and 200 kW of mechanical power per liter of engine displacement.

6. The engine powered generator of claim 1, wherein a three-way catalyst is used to reduce NOx emissions from the engine.

7. The engine powered generator of claim 1, wherein a flywheel or a supercapacitor is used between the generator and the stationary battery.

8. The engine powered generator of claim 1, wherein the engine is operated at an engine speed of at least 3600 RPM and the vehicle battery is charged at power level that is in the 50 to 250 kW range.

9. The engine powered generator of claim 1, wherein the stationary battery is charged at a power level that is less than the power level that is used for the vehicle battery charging and more than the level at which the stationary battery provides power for stationary use.

10. The engine power generator of claim 1, wherein the duty factor for charging the stationary battery is between 1% and 5%.

11. The engine powered generator of claim 1, wherein the engine is fueled with at least one of low carbon methanol or ammonia.

12. The engine powered generator of claim 1, wherein the exhaust from the engine passes through a three-way catalyst and the exhaust from the three-way catalyst is combined with air and urea, ammonia, or diesel exhaust fluid and is then passed through an SCR and wherein addition of air provides a desired lean fuel/air mixture that enters the SCR.

13. An engine powered generator that uses a spark ignition engine that is operated with a stoichiometric fuel/air ratio;
   wherein the electricity from the engine powered generator is used for charging of a vehicle battery;
   wherein AC electricity from the generator is converted into DC electricity;
   wherein a speed of the engine is varied along with the electric power that is used for vehicle battery charging;
   wherein a three-way catalyst is used for decreasing NOx in exhaust from the engine; and
   wherein the engine is fueled by at least one of methanol, ethanol, an ethanol-gasoline mixture or ammonia; and
   wherein hydrogen is also introduced into the engine.

14. The engine powered generator of claim 13, wherein the engine is fueled by methanol and the methanol is a low-carbon methanol.

15. The engine powered generator of claim 13, wherein the engine is fueled with ammonia.

16. The engine powered generator of claim 13, wherein the exhaust from the engine passes through a three-way catalyst and the exhaust from the three-way catalyst is combined with air and at least one of urea, ammonia, or diesel exhaust fluid, and is then passed through an SCR and wherein addition of air provides a lean fuel/air mixture that enters the SCR.

17. The engine powered generator of claim 16, wherein ammonia is passed through the SCR.

18. The engine powered generator of claim 13, comprising multiple engine powered generators that are used in a system for electric vehicle battery charging.

19. The engine powered generator of claim 13, wherein the engine powered generator has fuel switching capability fueling for operation with at least one of natural gas, propane, or gasoline.

20. The engine powered generator of claim 13, wherein the engine powered generator also provides charging for a stationary battery that provides electricity for stationary use at a lower power than is provided for vehicle battery charging.

21. The engine powered generator of claim 13, wherein the engine is a modified automotive engine.

22. The engine powered generator of claim 13, wherein the engine is a modification of a spark ignition engine used in natural gas powered medium or heavy duty trucks.

23. A power module that provides electricity, wherein the power module is a container that is transportable by truck hauling and provides electricity from at least 8 engine powered generators;
  wherein at least one engine powered generator of the at least 8 engine powered generators uses a modified automotive engine that operates at engine RPM of at least 3000 RPM;
  wherein the at least one engine powered generator is operated with a stoichiometric fuel air ratio;
  wherein the at least one engine powered generator is fueled by at least one of natural gas, propane, ethanol, an ethanol-gasoline mixture, gasoline, hydrogen, methanol or ammonia;
  wherein the at least one engine powered generator provides DC electricity;
  wherein the RPM and power of the at least one engine powered generator is varied;
  wherein the power module provides at least 2 MW of electricity;
  wherein the power module is used in an electricity generation system comprising multiple power modules that produce DC electricity; and
  wherein the power generated by the electricity generation system can be varied by varying the RPM in the engines, turning the engines on or off and/or by turning the power modules on or off.

24. The power module of claim 23, wherein the at least one engine powered generator is operated with a power density that is between 50 and 200 kW of mechanical power per liter.

25. The power module of claim 23, wherein the at least one engine powered generator is fueled by at least hydrogen and at least one of methanol or ammonia.

26. The power module of claim 23, wherein the engine powered generators and power modules are synchronized by use of DC electricity.

27. The power module of claim 26, wherein the cold start response time of the electricity generation system of multiple power modules is less than 10 seconds.

28. The power module of claim 23, wherein the electricity generation system that comprises multiple power modules provides electricity that is added to electricity from a gas turbine or a large reciprocating engine and wherein the electricity system of multiple power modules is operated with a lower capacity factor than the gas turbine or large reciprocating engine.

29. The power module of claim 23, wherein the at least one engine powered generator is fueled with natural gas, ethanol or an ethanol-gasoline mixture, or the combination of natural gas and ethanol or an ethanol-gasoline mixture.

30. The power module of claim 23, wherein the at least one engine powered generator is turbocharged wherein the fuel in the at least one engine powered generator is ethanol or an ethanol-gasoline mixture and the engine powered generator produces more than 500 kW.

31. The power module of claim 23, wherein the exhaust from the engine passes through a three-way catalyst and the exhaust from the three-way catalyst is combined with air and urea, ammonia, or diesel exhaust fluid and is then passed through an SCR, and wherein addition of air provides a lean fuel/air mixture that enters the SCR.

\* \* \* \* \*